US006366966B1

(12) United States Patent
Laney et al.

(10) Patent No.: US 6,366,966 B1
(45) Date of Patent: *Apr. 2, 2002

(54) METHOD AND SYSTEM FOR AUTOMATICALLY RUNNING A PROGRAM

(75) Inventors: Stuart T. Laney, Seattle; Christopher J. Guzak, Kirkland; Kurt J. Eckhardt, Redmond; Frederick J. DeWitt, Kirkland; Ronald O. Radko, Bellevue, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/355,998

(22) Filed: Dec. 13, 1994

(51) Int. Cl.⁷ ................................................ G06F 11/30
(52) U.S. Cl. ............................ 710/18; 710/15; 710/16; 710/17; 709/318
(58) Field of Search ..................... 700/681; 395/652, 395/670–78; 709/100–108, 318; 710/15, 16, 17, 18

(56) References Cited

U.S. PATENT DOCUMENTS

| 4,562,495 A | * | 12/1985 | Bond et al. | ............... 361/78.04 |
| 4,748,561 A | * | 5/1988 | Brown | ........................ 711/164 |
| 5,173,816 A | * | 12/1992 | Ogihara et al. | ................ 360/69 |
| 5,305,454 A | | 4/1994 | Record et al. | ............... 395/650 |
| 5,371,884 A | * | 12/1994 | Ross et al. | ................... 395/575 |
| 5,548,784 A | | 8/1996 | Easley, Jr. et al., | ......... 595/838 |
| 5,675,833 A | * | 10/1997 | Radko | ......................... 395/837 |
| 5,711,672 A | * | 1/1998 | Redford et al. | ............. 434/307 |
| 5,795,156 A | * | 8/1998 | Redford et al. | ............. 434/118 |

OTHER PUBLICATIONS

Stevens, Advanced Programming in the UNIX Environment, Addison–Wesley, p.283–285, Sep. 1993.*
Macintosh, Inside the Macintosh Vols. 1,2,3, Apple, p. I–244,257,523, Dec. 1985.*

* cited by examiner

Primary Examiner—Majid Banankhah
(74) Attorney, Agent, or Firm—Banner & Witcoff, Ltd.

(57) ABSTRACT

A method and system for automatically running a program stored on a medium upon detection of insertion of the medium into a drive are provided. The operating system periodically polls the drive regarding the status of the drive. After receiving a response from the drive regarding the drive's status, the operating system determines whether the drive's status has changed. If the drive's status has changed, the operating system broadcasts a message indicating the change in the drive's status. When the shell receives a message from the operating system indicating a change in the drive's status, the shell determines whether the change in the drive's status indicates that a medium has been inserted into the drive. If the change in the drive's status indicates that a medium has been inserted into the drive, the shell searches for a predefined file on the medium. The shell then runs a program stored on the medium that is specified in the predefined file. Thus, the running of the program on the medium is performed without any action being required on the part of a user.

58 Claims, 3 Drawing Sheets

METHOD AND SYSTEM FOR AUTOMATICALLY RUNNING A PROGRAM

FIELD OF THE INVENTION

This invention relates generally to computer systems and, more particularly, to a method and system in a computer system for automatically running a program stored on a medium upon detection of insertion of the medium into a drive.

BACKGROUND OF THE INVENTION

Application programs are commonly stored on removable media, e.g., floppy disks and CD-ROMs. When a user desires to run an application program stored on a particular medium, the user inserts the medium into the drive and then commands the operating system to run the program. The operating system then performs the necessary steps to run the program.

Conventional operating systems detect when a medium has been inserted into a drive by monitoring the drive or accessing the medium. For example, the operating system might access the medium in response to a request from a user to read from or write to the medium. When the operating system attempts to complete the requested access, the operating system detects whether a medium is present and thus, whether a medium has been inserted into the drive. Further, conventional operating systems cannot automatically run an application program on a medium. The operating system typically only runs a program in response to a request to run the program. For example, the user might enter a run command at the operating system's command line.

Users are demanding greater ease of use from computers. Users want to use programs, they do not want to have to perform a series of steps to use the programs. Thus, a method and system for automatically running a program stored on a medium upon detection of insertion of the medium into a drive are beneficial. Such a method and system are beneficial because they enable a user to run a program without any action being required on the part of the user (other than inserting the medium into the drive).

SUMMARY OF THE INVENTION

One aspect of the present invention provides a method and system for automatically running a program stored on a medium upon detection of insertion of the medium into a drive. The operating system periodically polls the drive regarding the status of the drive. After receiving a response from the drive regarding the drive's status, the operating system determines whether the drive's status has changed. If the drive's status has changed, the operating system broadcasts a message indicating the change in the drive's status. When the shell receives a message from the operating system indicating a change in the drive's status, the shell determines whether the change in the drive's status indicates that a medium has been inserted into the drive. If the change in the drive's status indicates that a medium has been inserted into the drive, the shell searches for a predefined file on the medium. The shell then runs a program stored on the medium that is specified in the predefined file. Thus, the running of the program on the medium is performed without any action being required on the part of a user.

DETAILED DESCRIPTION OF THE PREFERRED EMBODIMENT

Figure 1:
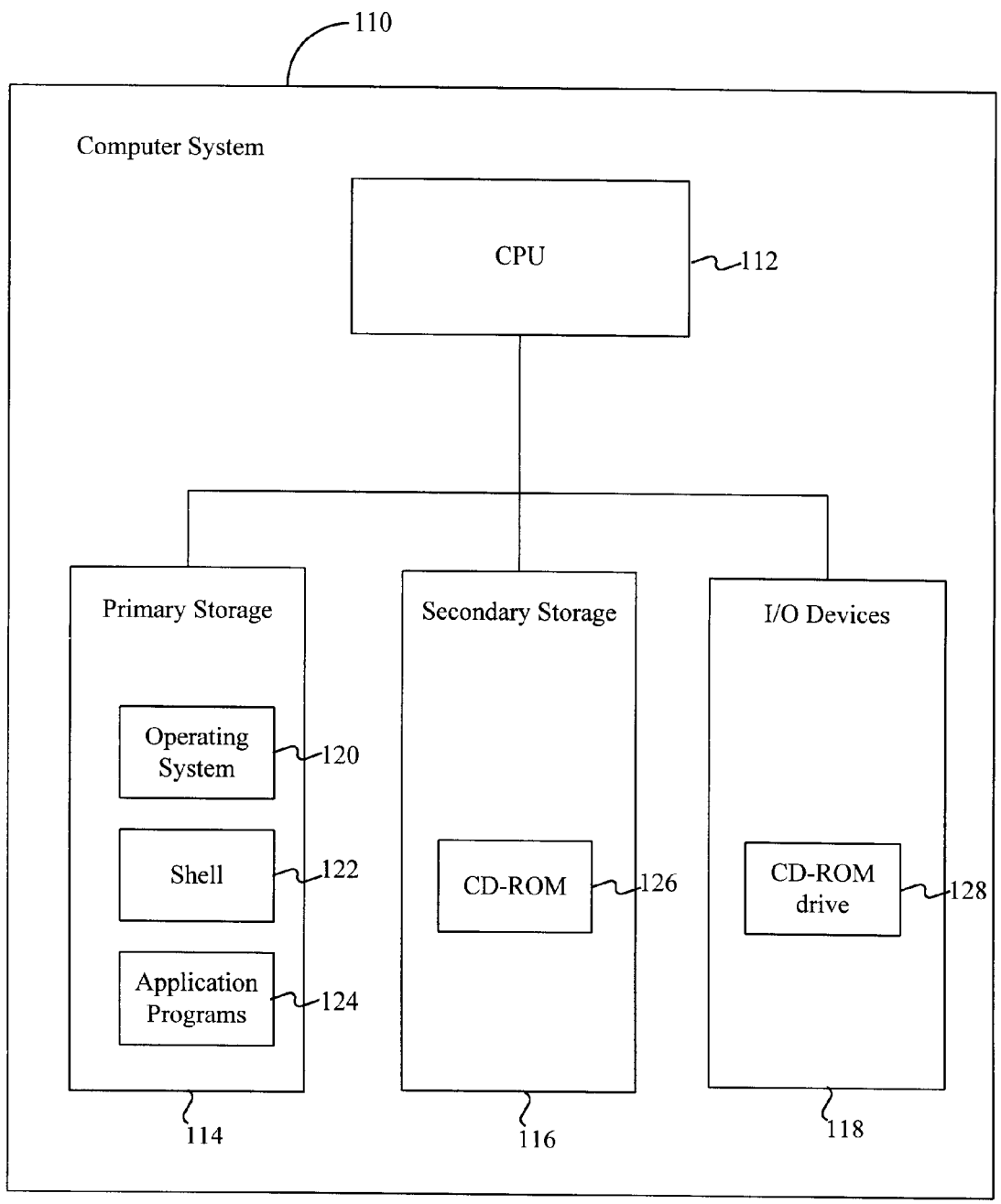
FIG. 1 is a schematic view of a computer system in which the preferred embodiment of the present invention operates.

The preferred embodiment of the present invention provides a method and system for automatically running a program stored on a CD-ROM upon detection of insertion of the CD-ROM into a CD-ROM drive. A computer system 10 in which the preferred embodiment of the present invention operates is illustrated in FIG. 1. The computer system 10 includes a central processing unit ("CPU") 12, a primary storage 14, a secondary storage 16, and input/output ("I/O") devices 18. An operating system 20, a shell 22, and application programs 24 are stored in the primary storage 14 for execution by the CPU 12. The shell 22 is a program that provides an interface between the operating system 20 and users. The secondary storage 16 includes a CD-ROM 26 and the I/O devices 18 include a CD-ROM drive 28.

Figure 2:
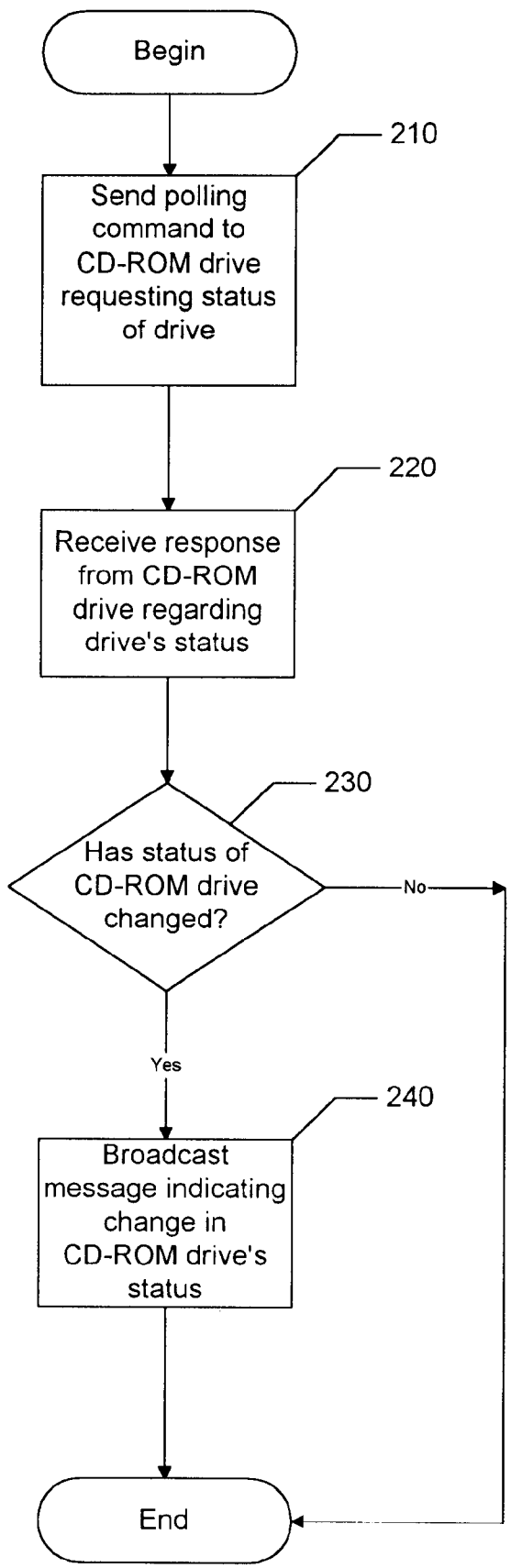
FIG. 2 is a high-level flowchart illustrating the process of automatically detecting the insertion of a CD-ROM into a CD-ROM drive.

One feature of the present invention automatically detects the insertion of a CD-ROM into the CD-ROM drive. The process of automatically detecting the insertion is illustrated in FIG. 2. Generally, the operating system periodically polls the CD-ROM drive regarding the status of the drive to determine if the status has changed and then, when the status has changed, broadcasts a message indicating the change in status. In step 210, the operating system sends a polling command (e.g., a Small Computer System Interface ("SCSI") Test Unit Ready Command) to the CD-ROM drive requesting the status of the drive. In the preferred embodiment of the present invention, the operating system polls the CD-ROM drive at frequent periodic intervals (e.g., every two seconds). In step 220, the operating system receives a response from the CD-ROM drive regarding the drive's status. The CD-ROM drive generally can have one of the following four statuses:

1) Drive is ready and has a CD-ROM;
2) Drive is becoming ready, i.e., the drive is in the process of spinning up;
3) Drive is not ready and does not have a CD-ROM; or
4) Drive is uncertain, i.e., drive has a CD-ROM but does not know what it is.

In step 230, the operating system determines whether the CD-ROM drive's current status is different than the drive's previous status and thus, whether the drive's status has changed. If the CD-ROM drive's status has changed, the operating system continues at step 240; otherwise, the operating system returns. In step 240, the operating system broadcasts a message to all programs, including the shell, indicating the change in the CD-ROM drive's status and then returns.

Figure 3:
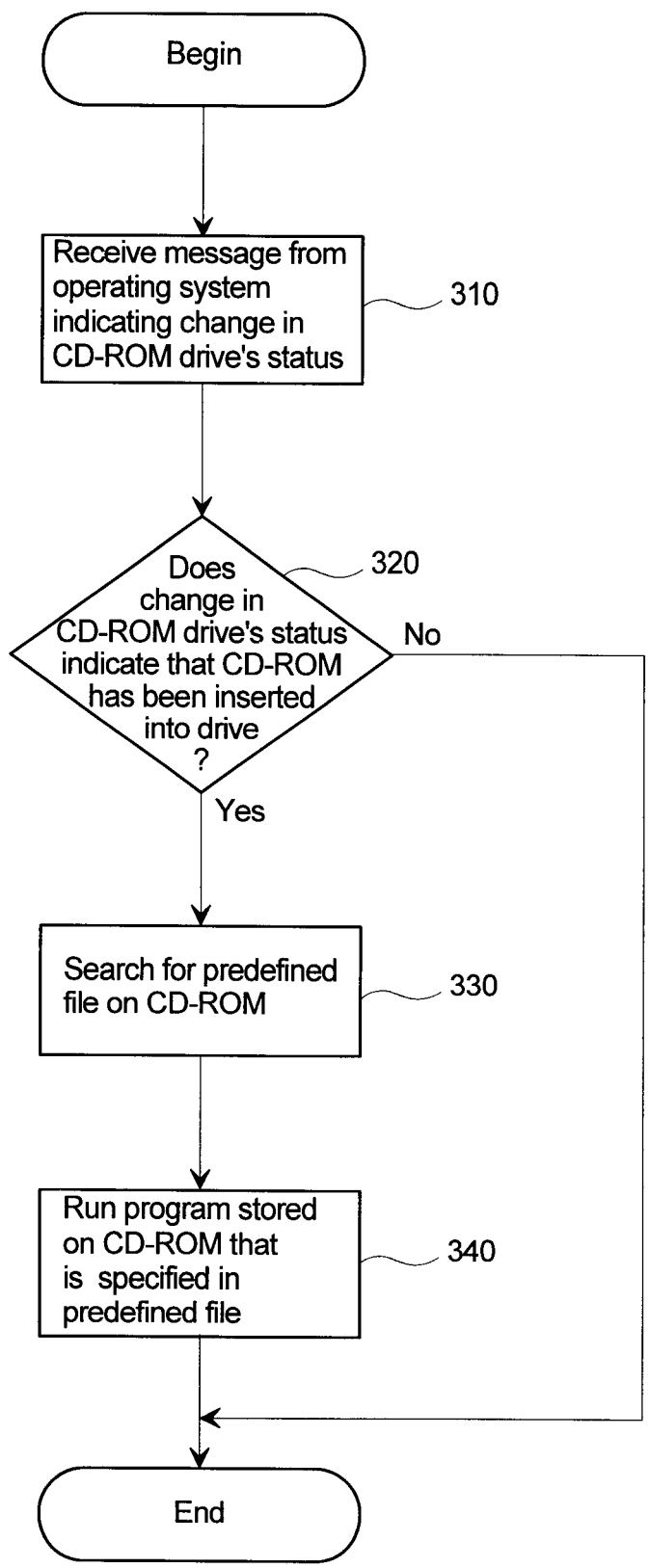
FIG. 3 is a high-level flowchart illustrating the process of automatically running a program stored on the CD-ROM upon detection of the insertion of the CD-ROM into the CD-ROM drive in FIG. 2.

Another feature of the present invention automatically runs a program stored on the CD-ROM upon detection of the insertion of the CD-ROM into the CD-ROM drive. The process of automatically running a program is illustrated in FIG. 3. Generally, when the shell receives a message from the operating system indicating that a CD-ROM has been inserted into the CD-ROM drive, the shell runs a specified program stored on the CD-ROM. In step 310, the shell receives a message from the operating system indicating a change in the CD-ROM drive's status. In step 320, the shell determines whether the change in the CD-ROM drive's status indicates that a CD-ROM has been inserted into the drive. If the change in the CD-ROM drive's status indicates that a CDROM has been inserted into the drive, the shell continues at step 330; otherwise, the shell returns. In step 330, the shell searches for a predefined file on the CD-ROM. In the preferred embodiment of the present invention, this file is named AUTORUN.INF and is stored in the CDROM's root directory. In step 340, the shell runs a program (or opens a document) stored on the CD-ROM that is specified in the predefined file and then returns.

In the preferred embodiment of the present invention, the format of the AUTORUN.INF file is as follows:

[AutoRun]
Open=<WinExec Command Line>

In the preferred embodiment of the present invention, the <WinExec Command Line> specifies the name of an executable program stored on the CD-ROM to run. In alternative embodiments of the present invention, the <WinExec Command Line> can specify the name of any program stored on the CD-ROM to run or the name of a document stored on the CD-ROM to open. When a document is specified in the <WinExec Command Line>, the shell opens the document and starts the application associated with the file extension of the document. The shell executes the <WinExec Command Line> relative to the root directory of the CD-ROM.

The following examples set forth sample AUTORUN.INF files and the steps that would be taken by the shell in response to the command lines in these files.

1) If the AUTORUN.INF file includes the following:

[AutoRun]
Open=\Demo\Startup.Exe the shell will run the program "Startup.Exe" in the "Demo" directory of the CD-ROM.

2) If the AUTORUN.INF file includes the following:

[AutoRun]
Open=\Demo.Bat
the shell will run the program "Demo.Bat" in the root directory of the CD-ROM.

3) If the AUTORUN.INF file includes the following:

[AutoRun]
Open=\ReadMe.Doc
the shell will open the document "ReadMe.Doc" in the root directory of the CD-ROM and will start the application associated with the ".Doc" file extension. In the "MICROSOFT WINDOWS" family of operating systems sold by Microsoft Corporation of Redmond, Washington, the ".Doc"file extension indicates that the document is a "MICROSOFT WORD" document. Thus, the application associated with this file would be "MICROSOFT WORD."

One of ordinary skill in the art will now appreciate that the present invention provides a method and system for automatically running a program stored on a medium upon detection of insertion of the medium into a drive. Although the present invention has been shown and described with reference to a preferred embodiment, equivalent alterations and modifications will occur to those skilled in the art upon reading and understanding this specification. For example, while the preferred embodiment of the present invention involves CD-ROM, one of ordinary skill in the art will appreciate that the principles of the present invention may be applied to other forms of removable storage media (such as floppy disks). The present invention includes all such equivalent alterations and modifications and is limited only by the scope of the following claims.

What is claimed is:

1. A method in a computer system for automatically executing a computer program stored on a medium upon insertion of the medium into a drive, the method comprising the computer-implemented steps of:

retrieving from the drive a first status of the drive;

retrieving from the drive a second status of the drive, the retrieving of the second status subsequent to the retrieving of the first status; and when a change from the first status to the second status indicates that the medium has been inserted into the drive, locating the computer program stored on the medium;

loading the located computer program into memory of the computer system; and starting execution of the loaded computer program.

2. The method of claim 1 wherein the retrieving of the first and second statuses is accomplished by periodically polling the drive to determine the current status of the drive, and wherein the change from the first status to the second status includes the second status indicating that the medium is in the drive and the first status indicating that the medium is not in the drive.

3. The method of claim 2 wherein the drive is a CD-ROM drive and the medium is a CD-ROM.

4. The method of claim 2 wherein the drive is a disk drive and the medium is a disk.

5. The method of claim 2 wherein the computer program is stored on the medium in a file with a predefined file name.

6. The method of claim 2 wherein the computer program is a batch file that contains an indication of other computer programs to execute.

7. A method in a computer system for automatically executing a computer program stored on a medium upon insertion of the medium into a drive, the method comprising the computer-implemented steps of:

without attempting to access any medium present in the drive, receiving an indication that the medium has been inserted into the drive;

upon receiving the indication, loading the computer program in memory of the computer system; and starting execution of the loaded computer program.

8. The method of claim 1 wherein the step of locating the computer program stored on the medium further comprises the steps of:

locating a file with a predetermined file name;

determining whether the located file is an executable program;

when it is determined that the located file is not an executable program, locating a computer program that can be used to open the located file; and when it is determined that the located file is an executable program, returning the location of the located file as the location of the computer program.

9. The method of claim 8 wherein the step of starting execution of the loaded computer program further comprises the step of, when the located file is not an executable program, using the executing computer program, opening the located file with a predetermined file name.

10. The method of claim 8 wherein the step of locating a computer program that can be used to open the located file uses a portion of the predetermined file name to locate an associated computer program.

11. A computer-readable memory medium containing instructions for controlling a computer processor in a computer system to automatically execute a computer program stored on a medium upon insertion of the medium into a drive by performing the steps of:

retrieving from the drive a current status of the drive; and when a change in the current status of the drive from a previous status of the drive indicates that the medium has been inserted into the drive, locating the computer program stored on the medium;

loading the located computer program into memory of the computer system; and starting execution of the loaded computer program.

12. The computer-readable memory medium of claim 11 wherein the step of retrieving includes periodically polling the drive to determine the current status of the drive, and wherein when the received current status indicates that the medium is in the drive and the previous status indicated that the medium was not in the drive, then detecting that the change in status indicates that the medium has been inserted into the drive.

13. The computer-readable memory medium of claim 11 wherein the drive is a CD-ROM drive and the medium is a CD-ROM.

14. The computer-readable memory medium of claim 11 wherein the drive is a disk drive and the medium is a disk.

15. The computer-readable memory medium of claim 11 wherein the computer program is stored on the medium in a file with a predefined file name.

16. The computer-readable memory medium of claim 11 wherein the computer program is a batch file that contains an indication of other computer programs to execute.

17. The computer-readable memory medium of claim 11 wherein the step of locating the computer program stored on the medium further comprises the steps of:

locating a file with a predetermined file name;

determining whether the located file is an executable program;

when it is determined that the located file is not an executable program, locating a computer program that can be used to open the located file; and when it is determined that the located file is an executable program, returning the location of the located file as the location of the computer program.

18. The computer-readable memory medium of claim 17 wherein the step of starting execution of the loaded computer program further comprises the step of, when the located file is not an executable program, using the executing computer program, opening the located file with a predetermined file name.

19. The computer-readable memory medium of claim 11 wherein the step of locating a computer program that can be used to open the located file uses a portion of the predetermined file name to locate an associated computer program.

20. A method in a computer system for executing a computer program, the computer program being stored on a medium, the computer system having a drive for reading the medium, the method comprising:

detecting insertion of the medium into the drive without attempting to access any medium present in the drive;

upon and in response to detecting that the medium has been inserted into the drive, loading the computer program from the inserted medium into memory of the computer system; and starting the execution of the computer program loaded in the memory of the computer system.

21. The method of claim 20 wherein the detecting, loading, and starting are performed by an operating system executing on the computer system.

22. The method of claim 20 wherein the detecting includes periodically polling the status of the drive to determine whether the medium has been recently inserted.

23. The method of claim 20 wherein the drive is a CD-ROM drive.

24. The method of claim 20 wherein a user inserts the medium into the drive.

25. The method of claim 24 wherein the loading and starting occurs without any further action being required of the user.

26. The method of claim 24 wherein the loading and starting occurs without any action being required of the user other than inserting the medium into the drive.

27. The method of claim 20 wherein an operating system is executing on the computer when the medium is inserted into the drive.

28. A method in a computer system for executing a computer program stored on a medium, the computer system having a device into which the medium is to be inserted, the method comprising:

detecting insertion of the medium into the device based on a change in status for the device, the change in status unrelated to any contents of any medium inserted in the device; and in response to detecting that the medium has been inserted into the device, running the computer program that is stored on the inserted medium.

29. The method of claim 28 wherein the detecting is performed by an operating system executing on the computer system.

30. The method of claim 28 wherein the detecting includes periodically polling the status of the device to determine whether the medium has been inserted.

31. The method of claim 28 wherein the device is a CD-ROM drive.

32. The method of claim 28 wherein a user inserts the medium into the device.

33. The method of claim 32 wherein the running occurs without any further action being required of the user.

34. The method of claim 32 wherein the running occurs without any action being required of the user other than the inserting of the medium into the device.

35. The method of claim 28 wherein an operating system is executing on the computer system when the medium is inserted into the device.

36. A method in a computer system for executing a computer program for accessing a file stored on a medium, the computer system having a device into which the medium is to be inserted, the method comprising:

detecting insertion of the medium into the device;

in response to detecting that the medium has been inserted into the device, determining whether the file stored on the medium is an executable program;

when it is determined that the file is not an executable program, locating a computer program that can be used to open the file;

starting execution of the computer program; and under control of the executing computer program, loading at least a portion of the file from the inserted medium into memory of the computer system; and processing the portion of the loaded file.

37. The method of claim 36 wherein the detecting includes periodically polling the status of the device to determine whether the medium has been recently inserted.

38. The method of claim 36 wherein the device is a CD-ROM drive.

39. The method of claim 36 wherein a user inserts the medium into the device.

40. The method of claim 39 wherein the starting, loading, and processing occurs without any further action being required of the user.

41. The method of claim 39 wherein the starting, loading, and processing occurs without any action being required of the user other than inserting the medium into the device.

42. The method of claim 36 wherein an operating system is executing on the computer system when the medium is inserted into the device.

43. The method of claim 36 wherein the medium contains another file having a predetermined file name, the other file containing the file name of the file to be accessed.

44. The method of claim 43 wherein the computer system has a plurality of programs and including selecting one of the plurality of programs to start executing based on the file name of the file to be accessed contained in the other file.

45. A method in a computer system for processing a medium that is inserted into a device, the medium containing one or more files, the method comprising:
   detecting insertion of the medium into the device; and
   in response to detecting that the medium has been inserted into the device,
      locating a file with a predetermined file name that is contained on the medium;
      determining whether the file is executable; and
      when it is determined that the file is not executable,
         loading at least a portion of the located file into memory of the computer system; and
         executing a computer program to process the loaded portion of the file.

46. The method of claim 45 including when it is determined that the file is executable, executing the file.

47. The method of claim 45 wherein a user inserts the medium into the device.

48. The method of claim 47 wherein the locating, loading, and processing occurs without any further action being required of the user.

49. The method of claim 47 wherein the locating, loading, and processing occurs without any action being required of the user other than inserting the medium into the device.

50. The method of claim 45 wherein the device is a CD-ROM drive.

51. The method of claim 45 wherein an operating system is executing when the medium is inserted into the device.

52. A computer-readable medium containing a data structure that enables a computer system to automatically detect insertion of mediums into drives of the computer system, the data structure comprising:
   for at least one of the drives,
      a previous drive status indicating that a medium is not present in the drive; and
      a current drive status indicating that the medium is present in the drive,
   so that the computer system can automatically detect insertion of a medium into a drive by detecting a change in the current drive status for that drive from the previous drive status for that drive, the change indicating that the medium has been inserted into that drive.

53. The computer readable medium of claim 52 wherein the data structure further enables the computer system to, after detecting the change that indicates that the medium has been inserted into the drive, automatically access a file having a predetermined name that is stored on the medium.

54. The computer readable medium of claim 52 wherein the previous drive status and the current drive status are obtained without attempting to access contents of a medium present in the drive.

55. The computer readable medium of claim 52 wherein a stored current drive status for a drive is updated by polling the drive.

56. A method in a computer system for automatically accessing a file stored on a medium upon insertion of the medium into a device, the method comprising:
   detecting insertion of the medium into the device via a change in status of the device; and
   without user input, accessing the file stored on the medium by,
      determining whether the file is executable;
      when it is determined that the file is executable, starting execution of the file; and
      when it is determined that the file is not executable,
         locating a computer program that can be used to access the file; and
         starting execution of the computer program in order to access the file.

57. The method of claim 56 wherein a first process executing on the computer system performs the detecting of the insertion and broadcasts a notification of the insertion to other executing processes, and wherein one of the other executing processes performs the accessing of the file in response to receiving the broadcast notification.

58. A method in a computer system for an executing process to automatically access a file stored on a medium upon insertion of the medium into a device, the method comprising:
   detecting insertion of the medium into the device;
   broadcasting a notification of the insertion to other executing processes; and
   under control of one of the other executing processes,
      receiving the broadcast notification; and
      in response to the received notification, accessing the file stored on the inserted medium.

* * * * *

UNITED STATES PATENT AND TRADEMARK OFFICE
CERTIFICATE OF CORRECTION

PATENT NO.    : 6,366,966 B1
DATED         : April 2, 2002
INVENTOR(S)   : Stuart Laney et al.

It is certified that error appears in the above-identified patent and that said Letters Patent is hereby corrected as shown below:

<u>Column 1,</u>
Line 20, "Conventional operating systems detect when a medium has been inserted into a drive by monitoring the drive or accessing the medium." has been replaced with -- Conventional operating systems cannot monitor the status of drives to detect when a medium is inserted into a drive. The operating system typically only detects that a medium has been inserted into the drive when the operating system accesses the medium. --;

<u>Column 3,</u>
Line 50, ".Doc"file" has been replaced with -- .Doc" file --;

<u>Column 4,</u>
Lines 24 and 26, "claim 2" has been replaced with -- claim 1 --;
Lines 28 and 30, "claim 2" has been replaced with -- claim 1 --;

<u>Column 6,</u>
Line 15, -- system -- has been inserted after the word "computer".

Signed and Sealed this

Twenty-eighth Day of January, 2003

JAMES E. ROGAN
*Director of the United States Patent and Trademark Office*